United States Patent
Rogers et al.

(10) Patent No.: US 6,856,731 B2
(45) Date of Patent: Feb. 15, 2005

(54) HEAT TUNABLE OPTICAL DEVICES WITH LINEARITY COMPENSATION

(75) Inventors: John A Rogers, Champaign, IL (US); Todd R. Salamon, Chatham, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 88 days.

(21) Appl. No.: 10/410,931

(22) Filed: Apr. 10, 2003

(65) Prior Publication Data

US 2004/0202420 A1 Oct. 14, 2004

(51) Int. Cl.⁷ .............................................. G02B 6/34
(52) U.S. Cl. ............................. 385/37; 385/10; 385/49
(58) Field of Search ........................... 385/37, 2, 8, 10, 385/14, 39, 40, 49

(56) References Cited

U.S. PATENT DOCUMENTS

| | | | |
|---|---|---|---|
| 4,794,618 A * | 12/1988 | Mito | 372/96 |
| 6,181,852 B1 * | 1/2001 | Adams et al. | 385/37 |
| 6,192,177 B1 * | 2/2001 | Amundson et al. | 385/37 |
| 6,275,629 B1 * | 8/2001 | Eggleton et al. | 385/37 |
| 6,303,182 B1 * | 10/2001 | Eggleton et al. | 427/163.2 |
| 6,370,300 B1 * | 4/2002 | Eggleton et al. | 385/37 |
| 6,370,301 B1 * | 4/2002 | Kokura | 385/37 |
| 6,411,746 B1 * | 6/2002 | Chamberlain et al. | 385/2 |
| 2002/0018619 A1 * | 2/2002 | Hoshino | 385/37 |
| 2002/0126956 A1 * | 9/2002 | Bouteiller et al. | 385/37 |

* cited by examiner

Primary Examiner—Frank G. Font
Assistant Examiner—K. Cyrus Kianni

(57) ABSTRACT

Wide range linear tuning of optical gratings is possible by selecting a thin film heater such that the temperature variation in heater's resistivity $\rho$ matches the temperature variation in the heat transfer coefficient of air h. A tunable optical device, such as a fiber grating with such a grating heater, exhibits near linear tuning characteristics over a wide range of temperatures and tuning currents. The heater is useable in other heat tunable optical devices such as interferometers.

12 Claims, 1 Drawing Sheet

HEAT TUNABLE OPTICAL DEVICES WITH LINEARITY COMPENSATION

FIELD OF THE INVENTION

This invention relates to heat tunable optical devices.

BACKGROUND OF THE INVENTION

Optical waveguide gratings are important elements in optical communication systems. Waveguide gratings comprise a sequence of refractive index perturbations located along a waveguide. A grating freely transmits some wavelengths but not others depending on the spacing between perturbations. The distances between the perturbations and the index of refraction of the supporting optical structure determine the grating's transmission wavelength. Gratings can be fabricated in optical fibers or in planar waveguides as integrated optical structures.

Gratings are generally narrowband devices that reflect a wavelength that is fixed at the time of manufacture. The reflected bandwidth can be somewhat broadened by varying the spacing between perturbations ("chirping") but even chirped devices are fixed at a relatively narrow bandwidth. It is important for many applications that gratings be wavelength tuneable. In some applications, tuning is needed to achieve a specific desired transmission and/or reflection wavelength. In other applications, tuning can be used to switch the grating among a plurality of transmission and/or reflection wavelengths. Wavelength tuning has been accomplished by altering the grating temperature with electrical heaters. Typically a current is passed through a deposited metal film thus raising the temperature of the film by ohmic heating. Changing the temperature of a grating changes the grating's transmission and/or reflection wavelength by changing the index of refraction in the waveguide (optical fiber in the case of a fiber grating) and to a lessor extent, by changing the spacing between perturbations.

Unfortunately, existing electrically heated tunable gratings, as well as other electrically heated tuneable optical devices, exhibit a limited useful tuning range. This is because heat tuning becomes non-linear at higher currents. Nonlinear tuning is particularly problematic in devices such as linearly chirped Bragg gratings, where the distance between perturbations varies linearly along the length of the grating. At higher heater currents the distances between the grating lines begins to change non-linearly.

Accordingly, there is a need for a way to fabricate heat tunable optical devices such that they can exhibit linear tuning characteristics over a far greater tuning range than is currently available.

SUMMARY OF THE INVENTION

Wide wavelength tuneability is achieved in an optical device by selecting a metal heater electrode such that the ratio of the electrode's resistivity $\rho(T)$ to the heat transfer coefficient of the ambient medium $h(T)$ has a low variation over the operating temperature range of the grating.

In one aspect, the invention features a heat tunable optical device that includes an optical waveguide configured to dissipate heat into a medium whose heat dissipation coefficient is h and a resistive layer located along the waveguide. The resistive layer has a thickness profile that varies along an axis of the waveguide. The thickness profile establishes an ohmic heating profile. The resistive layer is a material with a resistivity $\rho$. The ratio $h/\rho$ varies by less than 5% over an operating range of at least 150° C.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale.

DESCRIPTION

Figure 1:
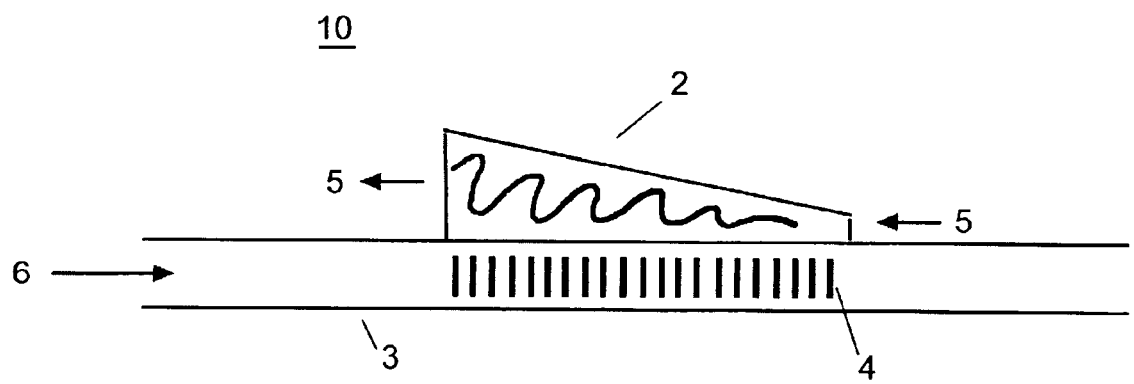
FIG. 1 is a cross-sectional view of a heat tunable optical device with a tapered metal heater.

FIG. 1 shows a heat tunable optical device 10 having linear wavelength tuning over an enhanced temperature range. Thin film heater 2 (shown in a partial cutaway view) is deposited onto the outer surface of the optical device 4, e.g., a fiber grating. In some embodiments, the thin film partially or completely covers the outer surface of an optical fiber comprising optical device 4. The heater can also extend beyond the ends of the optical device 4 to improve control of the end portions of the device 4. Current 5 passes through the metal of thin film heater 2, causing the designed heating profile. The electrical $I^2R$ heating varies according to R as determined by $\rho(T)$. The index of refraction in the part of the optical fiber comprising grating 4 changes accordingly. The heater 2 includes a metal or alloy with a resistivity $\rho(T)$ whose variation with temperature matches the variation with temperature of the heat transfer coefficient h(T) of the surrounding medium. The heatflow from the heater to the surrounding dissipative media is such that the temperature profile along the optical device 4 is maintained through the operating temperature range of the device 4. In a media such as air, a thin film heater 2 of either Gold or a Gold-Palladium alloy enables one to maintain the temperature variation of the ratio of $\rho/h$ below 5% over a heater current range that produces temperature variations of about 150° C. or more.

The coefficient of heat transfer h is defined at the surface of heater 2 that is in contact with the surrounding media. The media can be any material, including air. h is solely a measure of the heat flow across the surface of the heater and is typically defined (see C. O. Bennett and J. E. Meyers, "Momentum, Heat and Mass Transfer", $3^{rd}$ edition, McGraw-Hill, 1982) as $$h = q_s/(T_s - T_{env}),$$

where $q_s$ is the local heat flux per unit area at the surface of the heater, $T_s$ is the heater surface temperature and $T_{env}$ is a temperature representative of the surrounding media. h is affected by the choice of media, but once the media surrounding the heater is in place, h is defined. Thus h can be set as per the inventive method for a great variety of combinations of surrounding media.

As described thus far, heater 2 can simply be operated in air. In practice, it is less desirable to operate device 10 in this manner, because varying air current can cause strong convective effects that can make it difficult to achieve a stable temperature profile along device 4. A preferred embodiment can enclose the heater in a glass tube (not shown). Here, the glass tube can act as a high thermal impedance, that is an insulator, to diminish the effects of convection in free air. Convection might still create a larger thermal gradient in the tube, but it can "buffer" the heater 2 and device 4 from the transient effects of changing convection currents.

Metal alloys may be particularly suitable for making a thin film heater 2 whose temperature coefficient of resistivity matches to the heat transfer coefficient of the surrounding medium. For example, a Gold-Palladium (Au/Pd) alloy is particularly useful, because the relative Au to Pd composition of such an alloy can be adjusted to match the temperature variation of the heater's resistivity, $\rho$, to the temperature variation of the heat transfer coefficient, h, of the surrounding media, e.g., air. Use of such an alloy should enable reducing the variation of $\rho(T)/h(T)$ to less then 5% and preferably to less than 2% over a 150° C. operating range. For the thin film heater 2, Au/Pd alloys also can provide advantages from the standpoint of their small grain sizes and their resistance to electromigration.

Conventional thin film heaters were not designed to match the temperature variation of $\rho(T)$ to the temperature variation of $h(T)$ as described above. For that reason, the reflected wavelength spectrum did not have a chirp that remained linear for different heater currents in such conventional devices. In particular, the temperature profile that such conventional heaters produced depended on the heater current. Some currents in the device's operating ranges produce nonlinear wavelength chirps in reflected light, and such nonlinear chirps did not afford acceptable dispersion compensation.

The inventive heater is particularly suitable for use in tunable gratings. Optical fiber gratings are most typically made by exposing a length of doped optical fiber to UV radiation through a mask. Gratings can also be imprinted into optical fiber 3 by other techniques known to the art. A thin film heater 2 is then deposited onto the outer surface of the optical device 4, here a fiber grating. When heated by thin film heater 2, the index of refraction in the part of the optical fiber comprising grating 4, changes with temperature. And, to a lessor extent, the distance between the refractive index perturbations also changes with temperature. This tunes the transmission and/or reflection wavelengths of the grating 4. As before, thin film heater 2 is fabricated with a thickness profile that varies monotonically with axial position along the optical fiber 2, e.g., a linear profile variation with axial position may be used. Specific thickness profiles cause predetermined heating patterns along the grating.

Other types of optical devices also employ heat-controlled tuning. For example, heat tuning can be used with Mach-Zehnder interferometers to adjust the delay in one or both of the interferometer legs. Similarly, heat tuning can be employed to adjust parameters of other optical devices that depend on the local index of refraction or yet other properties of the waveguide or optical device that vary with the local temperature. While the exemplary devices are optical fiber devices, such as fiber gratings, the inventive technique of alloy selection is equally suitable for use in thin film heaters for planer waveguide devices as well as other heat tuning applications in integrated optical structures.

EXAMPLE

The optical device of the example is a temperature controlled dispersion compensator, which is similar to the device 10 shown in FIG. 1. An electrical current 5 is passed through thin film resistive heater 2 to heat the optical waveguide 3 that the heater is bonded to. By heating the waveguide 3, by the resistive heater 2 that is bonded to fiber 3, the temperature change of fiber changes the index of refraction of the device. The change in index of refraction causes the reflection wavelength of the grating to change. Light 6 is incident on the grating 4, which reflects some wavelengths of said incident light in the opposite direction. The thickness profile of heater 2 is designed to cause a linear temperature profile to develop along the length of grating 4. The linear temperature profile produces a linear chirp in the grating 4. Herein, a chirped grating is a grating whose reflection wavelength and Bragg wavelength varies with position along the grating. Linear chirping causes different portions of the grating to reflect light at different wavelengths; the reflection wavelength varying linearly with distance along the grating. In an advantageous embodiment, device 10 can be enclosed in a glass tube (not shown) to minimize the effects of convention in air.

The inventors noticed that the chirp profile of conventional wavelength-tunable fiber gratings changed with currents in the resistive heater because of non-linear temperature effects. The compensator produced a linear chirp at lower currents, but a non-linear chirp at higher currents. The inventors realized that a linear temperature profile could be maintained over a wide range of heater currents if the ratio of the heater's resistivity, $\rho$, to the heat transfer coefficient of the surrounding media, h, varied by less than 5% over the temperature operating range of the device.

For a 160 GHz data rate in an optical communications system, the dispersion compensator should have an h/$\rho$ ratio that varies by less than 1% over the operating range to yield the needed linear temperature profile in the optical device controlled by the heater 2. By contrast, prior art dispersion compensators at 40 GHz have h/$\rho$ ratios that vary by about 10 to 15% over their temperature operating ranges. These heaters were generally made of Gold thin films.

Figure 2:
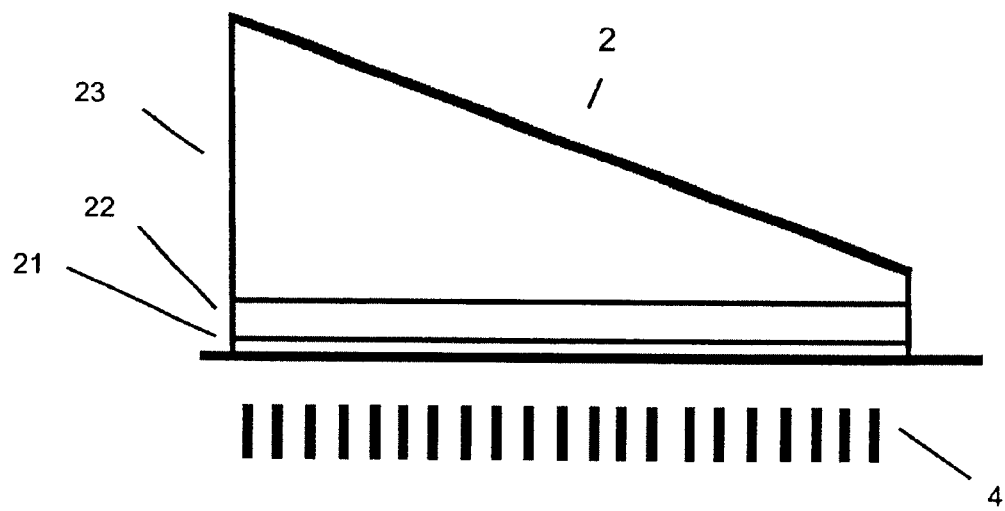
FIG. 2 is a cross-sectional view of a multilayer heater.

In one embodiment, the thin film resistive heater 2 is a multilayer stack of Titanium, Platinum, and Gold as shown in FIG. 2. The multilayer heater 2 comprises a Ti layer 21 that is about 25 Angstroms (A) thick, a Pt layer 22 that is about 1,000 A thick, and an a Au layer 23 with a thickness that varies linearly along the axis of optical fiber 3. The Au layer 23 has a linear taper in thickness along the length of the device. The taper produces a thickness that varies between about 2,000 A at one end and about 20,000 A at the other end. The taper in the Au layer 23 produces the desired linear temperature profile along the fiber 3. This multilayer heater 2 produces a temperature profile in the optical fiber 3 that is linear over an operating range of 150° C.

Thermal Modeling:

Through modeling efforts, the inventors found that the temperature variation of the heat transfer coefficient of air is an important part of understanding the problem. Conventional finite element thermal modeling of fiber grating devices that use integrated thin film heaters has revealed many aspects of heat flow that govern their operation. A one-dimensional approximation to the heat flow captures many important qualitative features of thermal diffusion. Nevertheless, significant inaccuracies seem to be present with films that have thicknesses greater than a few tenths of a micron. These effects are important in the design of devices that rely on thick films and/or large thermal gradients, such as tunable phase-shifted and superstructure gratings. The temperature dependence of the heat transfer coefficient and electrical resistivity of the metal film appears to be particularly important at high temperatures and large powers. The inventors realized that one way to remove such design problems is to choose heater materials such that the heater alloy's temperature coefficient of resistivity $\rho(T)$ matches the temperature variation in the heat transfer coefficient of air h(T).

We claim:

1. A heat tunable optical device, comprising:
   an optical waveguide configured to dissipate heat into a medium whose heat dissipation coefficient is h; and
   a resistive layer located along the waveguide and having a thickness profile that varies monotonically along an axis of the waveguide, the thickness profile establishing on ohmic heating profile in the waveguide, and
   wherein the layer is a material with a resistivity $\rho$; and
   wherein a ratio $h/\rho$ varies by less than 5% over an operating range of at least 150° C.

2. The device of claim 1, wherein the ratio $h/\rho$ varies by less than 2% over an operating range of at least 150° C.

3. The device of claim 1, wherein the waveguide is an optical fiber located to dissipate heat into the ambient media comprising one or more gases in a glass tube.

4. The device of claim 3, wherein the one or more gases comprise air.

5. The device of claim 3, wherein the waveguide includes a Bragg grating.

6. The device of claim 1, wherein the device comprises a Mach-Zehnder interferometer, the waveguide being one leg of the interferometer.

7. The device of claim 1, wherein the waveguide is an optical fiber.

8. The device of claim 1, wherein the waveguide is a planer waveguide.

9. The device of claim 1, wherein the layer includes a multilayer stack of Titanium, Platinum, and Gold.

10. The device of claim 1, wherein the multilayer stack comprises about 25 Angstroms (A) Ti, about 1,000 A Pt, and between 2,000 A to 20,000 A Gold.

11. The device of claim 1, wherein the profile produces a resistance that generates a linear temperature gradient along the waveguide.

12. The device of claim 1, wherein the thickness of the layer varies inversely with distance along the waveguide.

* * * * *